United States Patent
Bader (10) Patent No.: US 10,259,735 B1
(45) Date of Patent: Apr. 16, 2019

(54) DE-SCALING METHODS FOR DESALINATION PLANTS AND A NEW BRINE-FORWARD MULTI-STAGE FLASH CONCEPT

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 474 days.

(21) Appl. No.: 14/544,436

(22) Filed: Jan. 6, 2015

Related U.S. Application Data (63) Continuation-in-part of application No. 14/544,317, filed on Dec. 22, 2014.

(51) Int. Cl.
| | | |
|---|---|---|
| *C02F 9/00* | (2006.01) | |
| *C02F 1/06* | (2006.01) | |
| *C02F 1/04* | (2006.01) | |
| *C02F 1/20* | (2006.01) | |
| *C02F 103/08* | (2006.01) | |
| *C02F 103/10* | (2006.01) | |
| *C02F 103/18* | (2006.01) | |
| *C02F 103/28* | (2006.01) | |
| *C02F 103/30* | (2006.01) | |
| *C02F 103/34* | (2006.01) | |

(52) U.S. Cl.
CPC ............... *C02F 9/00* (2013.01); *C02F 1/042* (2013.01); *C02F 1/06* (2013.01); *C02F 1/20* (2013.01); *C02F 2103/08* (2013.01); *C02F 2103/10* (2013.01); *C02F 2103/18* (2013.01); *C02F 2103/28* (2013.01); *C02F 2103/30* (2013.01); *C02F 2103/34* (2013.01); *C02F 2301/08* (2013.01)

(58) Field of Classification Search
CPC ....................................................... C02F 9/00
USPC ................... 203/10, 21, 85, 84, 88, DIG. 17
See application file for complete search history.

(56) References Cited

U.S. PATENT DOCUMENTS

| | | | | |
|---|---|---|---|---|
| 3,437,451 A | * | 4/1969 | Casaf .................. | C01D 17/006 210/729 |
| 4,548,614 A | * | 10/1985 | Ireland ..................... | C01D 3/06 159/DIG. 20 |
| 5,403,483 A | * | 4/1995 | Hayashida ........... | B01D 39/083 210/490 |
| 6,365,051 B1 | | 4/2002 | Bader | |
| 6,663,778 B1 | | 12/2003 | Bader | |

(Continued)

OTHER PUBLICATIONS

WHO. Desalination for Safe Water Supply. Public Health and the Environment World Health Organization. Geneva 2007.*

(Continued)

*Primary Examiner* — Nina Bhat (57) ABSTRACT

Scale forming ions in seawater and the like of saline streams cause engineering difficulties that severely restrict the potential productivity of any desalination method. This invention provides innovative de-scaling methods to effectively eliminate scale problems in desalination plants. As a result of such effective de-scaling methods, this invention also provides a new effective design for Multi-Stage Flash (MSF) desalination plants, which is based on what its coined a Brine-Forward (BF) concept. The BF-MSF concept is multi-boiling without supplying additional heat after the brine heater of each train, and multi-concentration without supplying additional seawater after the first train of the plant.

20 Claims, 6 Drawing Sheets

(56) References Cited

U.S. PATENT DOCUMENTS

| | | | |
|---|---|---|---|
| 7,093,663 B1* | 8/2006 | Bader | B01D 61/147 |
| | | | 166/279 |
| 7,392,848 B1 | 7/2008 | Bader | |
| 7,963,338 B1* | 6/2011 | Bader | B01D 61/364 |
| | | | 166/371 |
| 8,197,696 B1 | 6/2012 | Bader | |
| 8,915,301 B1* | 12/2014 | Bader | C02F 9/00 |
| | | | 166/371 |
| 8,961,916 B1 | 2/2015 | Bader | |
| 9,828,270 B2* | 11/2017 | Xia | B01D 61/10 |
| 2009/0001020 A1* | 1/2009 | Constantz | B01D 61/025 |
| | | | 210/652 |

OTHER PUBLICATIONS

Savage, S. et al. Interactions between chloride and sulfate or silica removals using an advanced lime-aluminum softening process. Jan. 13, 2007. http://www.redorbit.com.*

Nafey, Ahmed. Design and Simulation of Seawater Thermal Desalination Plants. Department of Chemical Engineering The University of Leeds. Nov. 1988. Accessed on Jul. 24, 2017 from: http://etheses.whiterose.ac.uk/15208/1/233228.pdf.*

U.S. Appl. No. 13/507,141.

Lerch, W., et al.; "The Sulphoaluminates of Calcium", the Bureau of Standards Journal of Research, Apr. 1929, vol. 2, pp. 715-731.

* cited by examiner

DE-SCALING METHODS FOR DESALINATION PLANTS AND A NEW BRINE-FORWARD MULTI-STAGE FLASH CONCEPT

BACKGROUND OF THE INVENTION

Figure 1:
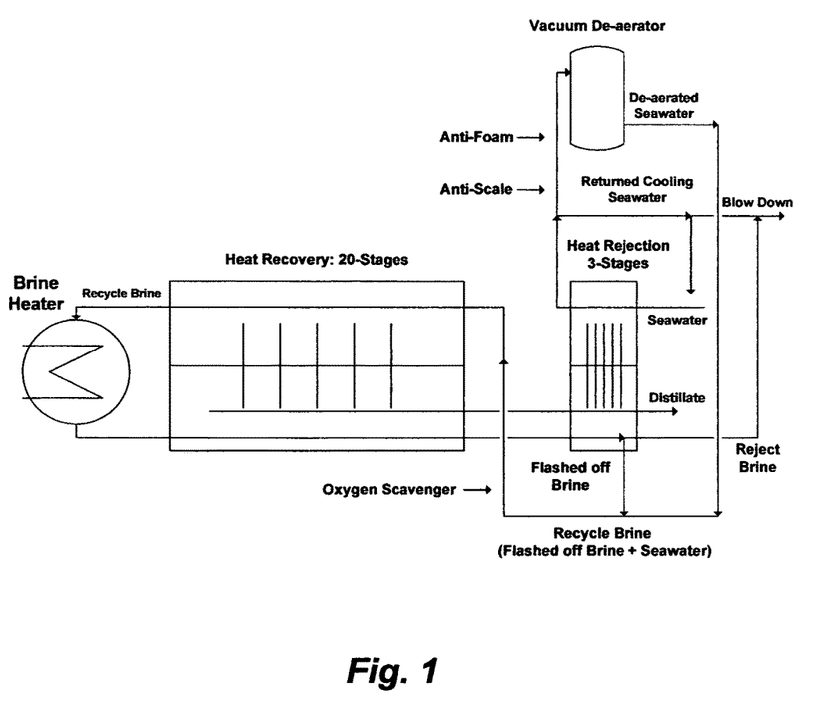
FIG. 1 illustrates a simplified flow diagram for a Recycle-Brine Multi-Stage Flash (RB-MSF) desalination train.

For example, two seawater desalination plants coupled with two power plants are recently installed in the Arabian Gulf area. The desalination plants are nearly identical and based on the Recycle-Brine Multi-Stage Flash (RB-MSF) concept. Each plant consists of eight identical trains, and each train produces 15 million U.S. gallons per day (MGD) of distillate at 100% load. The distillate production capacity of each plant is thus 120 MGD. FIG. 1 shows a simplified flow diagram for each BR-MSF train. The train mainly consists of three major sections: (1) heat rejection section; (2) heat recovery section; and (3) brine heater. The number of stages in the heat rejection section is 3 while the number of stages in the heat recovery section is 20.

Seawater is pretreated by mainly screening and chlorination before entering the last stage of the heat rejection section through heat transfer tubing (condensers/pre-heaters). A significant volume of pretreated seawater is required for cooling in the heat rejection section. About 70% of the preheated seawater exiting the heat rejection section is rejected as "returned cooling seawater". About 20% of such returned cooling seawater is recycled for mixing with seawater feed stream to maintain a constant temperature at the entrance of the heat rejection section whereas the remaining returned cooling seawater is mixed with reject brine from the last stage of the heat rejection section before blowing it back to the sea.

The remaining portion of the preheated seawater existing the heat rejection section (about 30% of the total required seawater) is mixed with additives (e.g., anti-scale and anti-foam) and fed to a vacuum de-aerator. The preheated and de-aerated seawater is then mixed with a portion of the flashed off brine from the last stage of the heat rejection section to form recycle brine. An oxygen scavenger is added to the recycle brine before passing it to the last stage of the heat recovery section.

In the heat recovery section, recycle brine passes through heat transfer tubing (condensers/pre-heaters) before entering the brine heater. The brine heater is externally driven by low-pressure (LP) and intermediate-pressure (IP) steam to heat recycle brine to the desired or designed top brine temperature of the train.

The heated recycle brine flows from the brine heater to the first flashing stage where the pressure is lowered so that it is just below the vapor saturation pressure of water. This sudden introduction of heated recycle brine into a lower pressure stage causes it to boil so rapidly as to flash into vapor. However, a small fraction of the recycle brine is converted into vapor. The remaining recycle brine thus passes through a series of flashing stages, each possessing a lower pressure to lower the boiling point of recycle brine than the previous stage. This allows consecutive reduction of the boiling point of recycle brine as it gets more concentrated in going down the flashing stages. MSF is thus a multiple boiling concept without supplying additional heat after the brine heater.

The flashed off vapor condenses on the tubes side of the condensers/pre-heaters and transports across the heat recovery section as distillate. The released latent heat of the condensed vapor is used to preheat the incoming recycle brine in the heat recovery section. Since the colder recycle brine entering the heat recovery section counter flows with the flashed off brine/distillate, relatively little heat energy leaves in the flashed off brine from the last stage of the heat recovery section. The unflashed portion of recycle brine then passes through additional flashing stages in the heat rejection section to recover more distillate. As such, most of the heat energy of the flashing process is exchanged with the recycle brine (heat recovery section) and seawater (heat rejection section) flowing into the train.

However, thermally unstable ions (bicarbonate, magnesium and calcium) in seawater present engineering difficulties that severely limit the potential capacity of any desalting method. In the RB-MSF train, bicarbonate in seawater is thermally but partially broken down in pre-heaters (heat rejection section) into carbon dioxide and hydroxides. Carbon dioxide is removed from seawater by the vacuum de-aerator whereas the released hydroxides along with the gradual temperature rise of seawater (heat rejection section) and recycle brine (heat recovery section) promote magnesium hydroxide (brucite) scaling. The initiation of brucite scale is critical since it acts as nucleation sites for calcium-containing scale species (carbonate in the form of aragonite and sulfates).

Calcium has three forms of sulfate. Calcium sulfate anhydrous and/or hemihydrate scaling takes place at higher temperatures (near the top brine temperature) whereas calcium sulfate dihydrate (gypsum) scaling takes place at lower temperatures. The solubility limits of calcium sulfate anhydrous or hemihydrate are inversely and steeply proportional with temperatures. Scale inhibitors are added mainly to delay the precipitation of sulfate scales even though their effect is very limited in solving such scales especially within the front end flashing stages in the heat recovery section. The temperature tolerance limit of scale inhibitors also dictates the top brine temperature (e.g., 90° C. for polyphosphates and 110° C. for polycarboxylates or polymeric), which is an undesirable restriction.

The desalination plants (I and II) are unusually located near a marshy shallow seawater area. Seawater can not be drawn from a deep water column to take advantage of reduced oxygen, suspended solids and microbial activity at depth. Seawater in that area is also known of having high silt index and low natural current. As shown in Table 1, the consequences of the plants' location along with discharging back to the sea a copious volume of reject brine (905.4 MGD) from both plants are clearly pronounced in the differences of the TDS and sulfate levels before and after operating the plants. Sulfate level, for example, has surged from 2,700 mg/L in 2006 to 4,100 mg/L in 2013 (increased by 52%).

Figure 2:
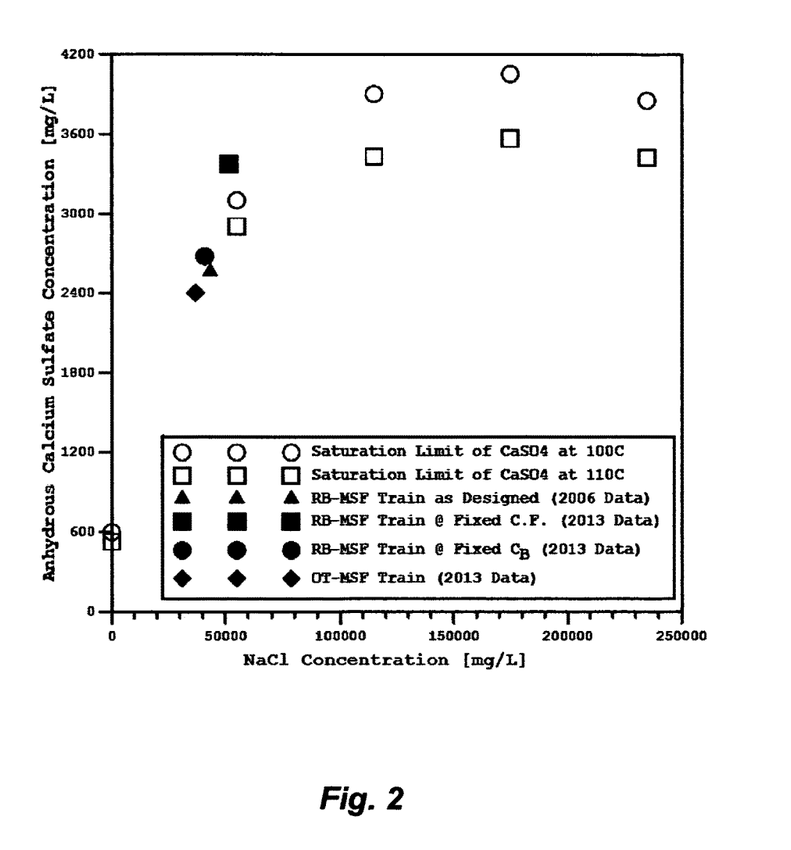
FIG. 2 illustrates the solubility limit of calcium sulfate anhydrous as a function of temperature and sodium chloride concentration.

Table 2 shows different operating conditions for a given RB-MSF train to cope with the consequences of improper plants' location. FIG. 2 reveals that the concentration of calcium sulfate anhydrous in the front-end flashing stages close to the brine heater (stage 1 to stage 4) when seawater has a normal sulfate level (2,700 mg/L) in 2006 is slightly below the saturation line. If the same operating conditions of the RB-MSF train as built including the same concentration factors (recycle brine/seawater and reject brine/seawater) are held regardless of the changes in seawater composition (4,100 mg/L of sulfate level in 2013), the concentration of calcium sulfate anhydrous in the flashing stages close to the brine heater is over saturated (FIG. 2). As presented in Table 2, the TDS and sulfate levels are appreciably increased in recycle brine and reject brine (e.g., the TDS and sulfate surges in recycle brine are, respectively, from 56,101 to 70,943 mg/L and from 3,835 to 5,823 mg/L).

In order to operate the RB-MSF plants properly and manage the detrimental changes in seawater composition (Table 1) in the form of sulfate scales, the reject brine concentration ($C_B$) must be fixed at 63,200 mg/L of TDS as the plants originally designed. The concentration factor of recycle brine/seawater ($C_r/C_F$) would be reduced to 1.13 from 1.42 whereas the concentration factor of reject brine/seawater ($C_B/C_F$) would be reduced to 1.27 from 1.6 (Table 2). The concentration of calcium sulfate anhydrous in the flashing stages close to the brine heater would then be kept at the saturation border line as shown in FIG. 2. However, the required seawater for blending with flashed off brine to form recycle brine would increase by 75% (Table 2). This, in turn, would: (1) elevate the required amounts of additives (anti-foam, anti-scale, and oxygen scavenger); (2) require larger vacuum de-aerators; (3) substantially increase the volume of reject brine (by 121%); and (4) require higher pumping power. It should be pointed out that the total required seawater (returned cooling seawater and preheated seawater to be blend with flashed off brine from the heat rejection) remains the same as in the original RB-MSF design (Table 2); returned cooling seawater is just proportionally decreased with the increase of preheated seawater to feed the heat recovery section.

Recycle Brine (RB) became the conventional approach compared to the Once-Through (OT) approach in designing MSF plants in the past 20 years for several presumed reasons. First, recycle brine reduces the actual volume of seawater to feed the trains for distillate production, which would reduce the amounts of additives, size of vacuum de-aerators and volume of reject brine. Second, RB-MSF adds a heat rejection section in each train to: (1) recover more distillate at the low flashing range (40-33° C.); (2) maintain a constant temperature at the entrance of the heat rejection section by blending a portion of returned cooling seawater with seawater feed stream, (3) dilute reject brine with the remaining portion of the returned cooling seawater before blowing it down to the sea; and (4) eliminate seawater de-alkalization. Seawater pretreatment in desalination plants conventionally includes a de-alkalization step by dosing an acid (e.g., sulfuric acid) to convert bicarbonate to carbon dioxide, removing carbon dioxide by the de-aerator, and then neutralizing the pretreated seawater or distillate (e.g., with caustic soda) to re-adjust the pH.

Figure 3:
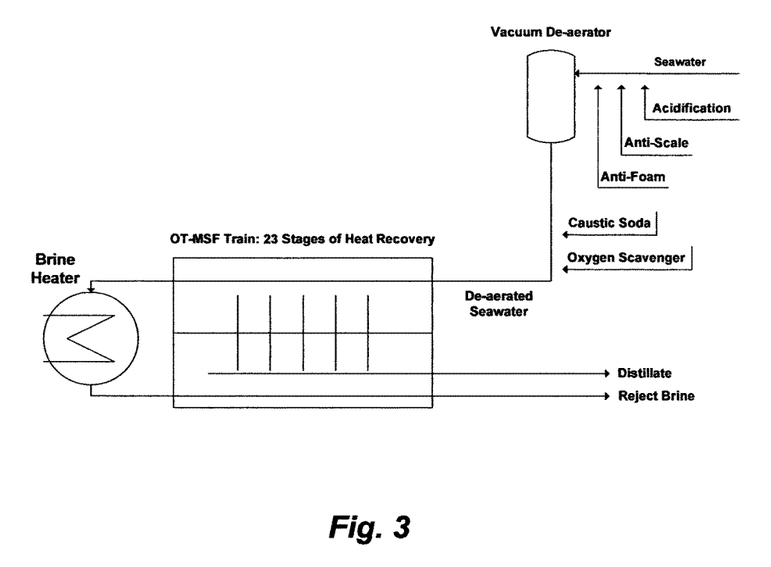
FIG. 3 illustrates a simplified flow diagram for a Once-Through Multi-Stage Flash (OT-MSF) desalination train.

On the other hand, the OT-MSF is a simpler approach than the RB-MSF approach since it consists of a number of stages and a brine heater as shown in FIG. 3. The performance ratio (PR) of OT-MSF train is comparable to RB-MSF train for the same number of stages and top brine temperature. Reject brine from OT-MSF train has low TDS gains compared to seawater and is directly discharged to the sea. As such, OT-MSF train does not require a substantial volume of cooling seawater since it has no heat rejection section nor a substantial pumping power to circulate a tremendous volume of recycle brine as is the case with RB-MSF plant. However, OT-MSF plant has a lower ratio of distillate/seawater than RB-MSF plant (no recycle brine), and it is brine from the last stage is typically rejected at 40° C. rather than 33° C. (a further but slight loss of distillate recovery), which are considered the drawbacks of the OT-MSF approach.

When an OT-MSF train, however, is applied to the changed composition of seawater (Table 1) by fixing $C_B$ at 63,200 mg/L of TDS as the RB-MSF train originally designed, it provided better performance than RB-MSF train with distinct advantages (Table 2). Such advantages can be seen in: (1) reducing the steam load (from 62.9 to 33.0 kg/s) and therefore substantially increasing the PR (from 9.4 to 13.6); (2) entirely eliminating the substantial volume of cooling seawater; and (3) keeping the concentration of calcium sulfate anhydrous in the flashing stages close to the brine heater slightly below the saturation border line (FIG. 2).

Regardless of the type of MSF plants, whether they are based on RB or OT approach, in order to produce 240 MGD of distillate and operate the plants properly, the saturation envelop of calcium sulfate anhydrous must be controlled by fixing $C_B$ at 63,200 mg/L of TDS. As consequences, the volumes of the total required seawater (2,247 MGD for RB-MSF and 1,146 MGD for OT-MSF) and reject brine (905.4 MGD for both RB-MSF and OT-MSF) are enormous. Thermal energy to brine heaters can be reduced from one-half to two thirds by pairing with waste heat from the turbines of the coupled power plants and at the same time providing cooling for the power plants, but pumping energy to circulate enormous volumes of seawater, recycle brine and reject brine along with pre-treating a large volume of seawater have become the largest operating costs of MSF plants. The discharge of a copious volume of reject brine to the sea increases TDS around seawater intake lines since it is dispersion not fast enough (shallow seawater, low natural current, and insufficient or absent mechanical dispersion devices), which deteriorates the natural composition of seawater and imposes different sets of plants' operating conditions. Disposal of reject brine has also a significant environmental impact on marine habitat including depleted oxygen, residue of the deoxygenating agent, concentrated toxic species (e.g., derivatives of boron and chlorine), and induction of gypsum precipitation. Such enormous engineering, economic and environmental difficulties are solely caused by calcium sulfate scale; a serious obstacle to the development of low cost distillate production from seawater desalination plants.

Effective de-scaling is thus essential in seawater desalination since it would: (1) allow better performance ratio (ratio of distillate to heating steam) and thus more efficient and cost effective plants; (2) reduce the volumes of seawater (substantial savings on pumping power and pre-treatment) and reject brine; (3) eliminate the addition of scale inhibitors; (4) allow desalination plants such as MSF to reach a higher range of top brine temperatures (120-150° C.) and thus increase their performance ratio by either decreasing steam load or increasing distillate production; (5) prevent maintenance shut-downs for chemical and mechanical scale removal; and (6) slow the decrease of heat transfer coefficients.

Thus, the first objective of this invention is to effectively eliminate scale issues in any desalination plants to achieve the above mentioned benefits. As a result of effective de-scaling, the second objective of this invention is to develop a new effective design for MSF plants, which is based on what I coined Brine-Forward (BF), to entirely eliminate brine recycling and returned cooling seawater.

SUMMARY OF THE INVENTION

In one aspect, the present invention provides a method for separating calcium and sulfate from a sulfate-rich saline stream to produce de-scaled saline stream suitable for a desalination system. The inventive method comprises the steps of: (a) separating calcium from the sulfate-rich saline stream to produce calcium-depleted saline stream; (b) separating sulfate from the calcium-depleted saline stream to produce de-scaled saline stream; (c) de-aerating the de-scaled saline stream by a vacuum de-aerator or an indirect-contact heat exchanging stripper to produce de-aerated saline stream; and (d) feeding the de-aerated saline to the desalination system to produce distillate and reject brine. Calcium is separated from the sulfate-rich saline stream in step (a) by: (i) mixing sulfate-rich saline stream with an amount of a calcium-precipitating additive to form precipitates comprising calcium in a first precipitator unit; and (ii) removing precipitates from the sulfate-rich saline stream by a filtration unit to produce calcium-depleted saline stream and dewatered precipitates. Sulfate is separated from the calcium-depleted saline stream in step (b) by: (i) mixing the calcium-depleted saline stream with appropriate amounts of an aluminum-based or iron-based additive and a hydroxide source to form precipitates comprising magnesium sulfoaluminate or magnesium sulfoferrate in a second precipitator unit; and (ii) removing precipitates from the calcium-depleted saline stream by an appropriate filtration unit to produce the de-scaled saline stream and dewatered precipitates. Sulfate-rich saline stream is seawater, brine from seawater desalination plants, natural brine, brackish water, produced water, hydro-fracturing flow-back water, flue gas desulphurization spent water, agricultural drainage water, acid mine drainage water, mineral slurry transport water, paper mills spent water, aluminum anodizing spent water, spent water from fertilizer production, lime slaking, or spent water from textile production. The desalination system can be a Recycle-Brine Multi-Stage Flash Desalination, Once-Through Multi-Stage Flash Desalination, Multi-Effect Distillation, Thermal Vapor Compression, Mechanical Vapor Compression, Vacuum Membrane Distillation, Direct-Contact Membrane Distillation, Osmotic Membrane Distillation, Reverse Osmosis, Forward Osmosis, or a combination of such methods. The calcium-precipitating additive is selected from the group consisting of sodium carbonate, sodium phosphate, sodium alginate, and sulfated polysaccharide. The hydroxide source is selected from the group consisting of aluminum hydroxide, iron hydroxide, magnesium hydroxide, magnesium oxide, ammonia, methylamine, ethylamine, isopropylamine, propylamine, dimethylamine, diethylamine, diisopropylamine, and dipropylamine, or a combination thereof. The aluminum-based additive is selected from the group consisting of aluminum hydroxide, aluminum chlorohydrate, sodium aluminate, aluminum acetate, aluminum chloride, and aluminum nitrate. The iron-based additive is selected from the group consisting of iron hydroxide, sodium ferrate, iron chloride, and iron nitrate.

In yet another aspect, the present invention provides a method for separating sulfate from a sulfate-rich saline stream to produce de-scaled saline stream suitable for a desalination system. The inventive method comprises the steps of: (a) separating sulfate from the sulfate-rich saline stream to produce de-scaled saline stream; (b) de-aerating the de-scaled saline stream by a vacuum de-aerator or an indirect-contact heat exchanging stripper to produce de-aerated saline stream; and (c) feeding the de-aerated saline to the desalination system to produce distillate and reject brine. Sulfate is separated from the sulfate-rich saline stream in step (a) by: (i) mixing the sulfate-rich saline stream with appropriate amounts of an aluminum-based or iron-based additive and a hydroxide source to form precipitates comprising magnesium-calcium sulfoaluminate or magnesium-calcium sulfoferrate in a second precipitator unit; and (ii) removing precipitates from the sulfate-rich saline stream by an appropriate filtration unit to produce the de-scaled saline stream and dewatered precipitates.

In yet another aspect, the present invention provides a method for partially preheating, and separating calcium and sulfate from a sulfate-rich saline stream to produce de-scaled saline stream suitable for the Brine-Forward Multi-Stage Flash (BF-MSF) desalination system. The inventive method comprises the steps of: (a) partially preheating sulfate-rich saline stream; (b) separating calcium from the partially preheated sulfate-rich saline stream to produce calcium-depleted saline stream; (c) separating sulfate from the calcium-depleted saline stream to produce de-scaled saline stream; (d) de-aerating the de-scaled saline stream by a vacuum de-aerator or an indirect-contact heat exchanging stripper to produce de-aerated saline stream; (e) feeding the de-aerated saline stream to the first train of the BF-MSF desalination system to produce a first distillate and a first brine; (f) applying a brine forward feeding procedure to feed the first brine from the first train of the BF-MSF desalination system to a second train to produce a second distillate and a second brine; and (g) repeating the brine forward feeding procedure in subsequent trains of the BF-MSF desalination system to allow consecutive increments in total dissolved solids until the total dissolved solids reach a desired level in the last train of the BF-MSF desalination system to reject brine. The sulfate-rich saline stream is partially preheated in step (a) by: (i) passing a portion of the sulfate-rich saline stream through heat transfer tubing of the heat rejection section in the last train of the BF-MSF desalination system to exchange heat energy with flashing brine in the same heat rejection section to produce preheated portion of sulfate-rich saline stream; and (ii) blending the preheated portion of sulfate-rich saline stream with another portion of sulfate-rich saline stream to produce partially preheated sulfate-rich saline stream. Calcium is separated from the partially preheated sulfate-rich saline stream in step (b) by: (i) mixing the partially preheated sulfate-rich saline stream with an amount of a calcium-precipitating additive to form precipitates comprising calcium in a first precipitator unit; and (ii) removing precipitates from the partially preheated sulfate-rich saline stream by a filtration unit to produce calcium-depleted saline stream and dewatered precipitates. Sulfate is separated from the calcium-depleted saline stream in step (c) by: (i) mixing the calcium-depleted saline stream with appropriate amounts of an aluminum-based or iron-based additive and a hydroxide source to form precipitates comprising magnesium sulfoaluminate or magnesium sulfoferrate in a second precipitator unit; and (ii) removing precipitates from the calcium-depleted saline stream by an appropriate filtration unit to produce the de-scaled saline stream and dewatered precipitates.

In yet another aspect, the present invention provides a method for partially preheating, and separating sulfate from a sulfate-rich saline stream to produce de-scaled saline stream suitable for the Brine-Forward Multi-Stage Flash (BF-MSF) desalination system. The inventive method comprises the steps of: (a) partially preheating sulfate-rich saline stream; (b) separating sulfate from the partially preheated saline stream to produce de-scaled saline stream; (c) de-aerating the de-scaled saline stream by a vacuum de-aerator or an indirect-contact heat exchanging stripper to produce de-aerated saline stream; (d) feeding the de-aerated saline stream to the first train of the BF-MSF desalination system to produce a first distillate and a first brine; (e) applying a brine forward feeding procedure to feed the first brine from the first train of the BF-MSF desalination system to a second train to produce a second distillate and a second brine; and (f) repeating the brine forward feeding procedure in subsequent trains of the BF-MSF desalination system to allow consecutive increments in total dissolved solids until the total dissolved solids reach a desired level in the last train of the BF-MSF desalination system to reject brine. The sulfate-rich saline stream is partially preheated in step (a) by: (i) passing a portion of the sulfate-rich saline stream through heat transfer tubing of the heat rejection section in the last train of the BF-MSF desalination system to exchange heat energy with flashing brine in the same heat rejection section to produce preheated portion of sulfate-rich saline stream; and (ii) blending the preheated portion of sulfate-rich saline stream with another portion of sulfate-rich saline stream to produce partially preheated sulfate-rich saline stream. Sulfate is separated from the partially preheated saline stream in step (b) by: (i) mixing the partially preheated saline stream with appropriate amounts of an aluminum-based or iron-based additive and a hydroxide source to form precipitates comprising magnesium-calcium sulfoaluminate or magnesium-calcium sulfoferrate in a second precipitator unit; and (ii) removing precipitates from the partially preheated saline stream by an appropriate filtration unit to produce the de-scaled saline stream and dewatered precipitates.

In yet another aspect, the present invention provides a method for preheating, and separating calcium and sulfate from a sulfate-rich saline stream to produce de-scaled saline stream suitable for the Brine-Forward Multi-Stage Flash (BF-MSF) desalination system. The inventive method comprises the steps of: (a) preheating the sulfate-rich saline stream; (b) separating calcium from the preheated sulfate-rich saline stream to produce calcium-depleted saline stream; (c) separating sulfate from the calcium-depleted saline stream to produce de-scaled saline stream; (d) de-aerating the de-scaled saline stream by a vacuum de-aerator or an indirect-contact heat exchanging stripper to produce de-aerated saline stream; (e) feeding the de-aerated saline stream to the first train of the BF-MSF desalination system to produce a first distillate and a first brine; (f) applying a brine forward feeding procedure to feed the first brine from the first train of the BF-MSF desalination system to a second train to produce a second distillate and a second brine; and (g) repeating the brine forward feeding procedure in subsequent trains of the BF-MSF desalination system to allow consecutive increments in total dissolved solids until the total dissolved solids reach a desired level in the last train of the BF-MSF desalination system to reject brine. Sulfate-rich saline stream is preheated in step (a) by: (i) passing a portion of sulfate-rich saline stream through heat transfer tubing of the heat rejection section of the last train of the BF-MSF desalination system to exchange heat energy with flashing brine in the same heat rejection section to produce a first preheated portion of sulfate-rich saline stream; (ii) preheating another portion of sulfate-rich saline stream by a direct-contact heat exchanger using a source of waste heat energy or a flashing fluid or a heating fluid or a fluid requires condensing to produce a second preheated portion of sulfate-rich saline stream; and (iii) blending the first preheated portion of sulfate-rich saline stream with the second preheated portion of sulfate-rich saline stream to produce preheated sulfate-rich saline stream. Calcium is separated from the preheated sulfate-rich saline stream in step (b) by: (i) mixing the preheated sulfate-rich saline stream with an amount of a calcium-precipitating additive to form precipitates comprising calcium in a first precipitator unit; and (ii) removing precipitates from the preheated sulfate-rich saline stream by a filtration unit to produce calcium-depleted saline stream and dewatered precipitates. Sulfate is separated from the calcium-depleted saline stream in step (c) by: (i) mixing the calcium-depleted saline stream with appropriate amounts of an aluminum-based or iron-based additive and a hydroxide source to form precipitates comprising magnesium sulfoaluminate or magnesium sulfoferrate in a second precipitator unit; and (ii) removing precipitates from the calcium-depleted saline stream by an appropriate filtration unit to produce the de-scaled saline stream and dewatered precipitates.

In yet another aspect, the present invention provides a method for preheating, and separating sulfate from a sulfate-rich saline stream to produce de-scaled saline stream suitable for the Brine-Forward Multi-Stage Flash (BF-MSF) desalination system. The inventive method comprises the steps of: (a) preheating the sulfate-rich saline stream; (b) separating sulfate from the preheated saline stream to produce de-scaled saline stream; (c) de-aerating the de-scaled saline stream by a vacuum de-aerator or an indirect-contact heat exchanging stripper to produce de-aerated saline stream; (d) feeding the de-aerated saline stream to the first train of the BF-MSF desalination system to produce a first distillate and a first brine; (e) applying a brine forward feeding procedure to feed the first brine from the first train of the BF-MSF desalination system to a second train to produce a second distillate and a second brine; and (f) repeating the brine forward feeding procedure in subsequent trains of the BF-MSF desalination system to allow consecutive increments in total dissolved solids until the total dissolved solids reach a desired level in the last train of the BF-MSF desalination system to reject brine. Sulfate-rich saline stream is preheated in step (a) by: (i) passing a portion of sulfate-rich saline stream through heat transfer tubing of the heat rejection section of the last train of the BF-MSF desalination system to exchange heat energy with flashing brine in the same heat rejection section to produce a first preheated portion of sulfate-rich saline stream; (ii) preheating another portion of sulfate-rich saline stream by a direct-contact heat exchanger using a source of waste heat energy or a flashing fluid or a heating fluid or a fluid requires condensing to produce a second preheated portion of sulfate-rich saline stream; and (iii) blending the first preheated portion of sulfate-rich saline stream with the second preheated portion of sulfate-rich saline stream to produce preheated sulfate-rich saline stream. Sulfate is separated from the preheated saline stream in step (b) by: (i) mixing the preheated saline stream with appropriate amounts of an aluminum-based or iron-based additive and a hydroxide source to form precipitates comprising magnesium-calcium sulfoaluminate or magnesium-calcium sulfoferrate in a second precipitator unit; and (ii) removing precipitates from the partially preheated saline stream by an appropriate filtration unit to produce the de-scaled saline stream and dewatered precipitates.

This invention is not restricted to use in connection with one particular application. This invention can generally be used for de-scaling to produce useful and salable salts, and if required, de-salting saline streams. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

I have previously invented the Liquid-Phase Precipitation process (LPP) for the separation of inorganic species from saline streams. The effect of the separation in LPP is to intermix a saline stream with a suitable solvent at ambient temperature and atmospheric pressure to form selective precipitates. The suitable solvents are those which have the capability to meet two basic criteria.

The first criteria is the suitability to precipitate targeted inorganic species from saline streams. The selected organic solvent must be miscible or at least soluble in water. Of equal importance, the targeted inorganic species must be sparingly soluble in the organic solvent. The addition of such a solvent to a saline stream leads to the capture of part of the water molecules and reduces the solubility of inorganic species in the water which form insoluble precipitates. The solubility of the targeted inorganic species in the organic solvent is a critical factor in achieving the degree of saturation. Solubility related factors such as ionic charge, ionic radius, and the presence of a suitable anion in the saline stream play important roles in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have relatively low toxicity since traces of the organic solvent always remain in the discharge stream. Further, the selected solvent must be chemically stable, compatible with the process, and relatively inexpensive.

The energy required to thermally separate the solvent from the aqueous mixture after precipitating the targeted inorganic species generally depends on the solvent's boiling point. For distillation purposes, solvent's boiling point determines the number of degrees to which the mixture must be heated. However, the solvent's specific heat and heat of vaporization are also critical. The specific heat of the solvent determines the number of calories that must be introduced into the mixture to raise it each degree whereas the heat of vaporization determines the number of additional calories needed to vaporize the solvent. As such, the smaller the solvent's specific heat and heat of vaporization, the fewer calories required for its thermal recovery.

Low boiling point solvents are thus preferred because the less difference between the mixture temperature and the solvent's boiling temperature, the fewer calories required for thermally separating the solvent from the mixture. In addition, with higher boiling point solvents, less complete solvents thermal recovery since the recovered solvents carry significant amounts of water. Carried over water, with its high heat of vaporization, represents an energy penalty.

Several amine solvents have been identified for potential use in the LPP process. The selected solvents, which are derivatives of ammonia, are primary and secondary amines. They include methylamine (MA), ethylamine (EA), isopropylamine (IPA), propylamine (PA), dimethylamine (DMA), diethylamine (DEA), diisopropylamine (DIPA), and dipropylamine (DPA).

Nitrogen can form compounds with only three covalent bonds to other atoms. An ammonia molecule contains $sp^3$-hybridized nitrogen atom bonded to three hydrogen atoms. On the other hand, an amine molecule contains $sp^3$-hybridized nitrogen atom bonded to one carbon atom (primary amines) or more carbon atoms (2 carbon atoms in the case of secondary amines). The nitrogen has one orbital filled with a pair of unshared valence electrons, which allows these solvents to act as bases. Ammonia and the selected amines are therefore weak bases that could undergo reversible reactions with water or other weak acids. However, when such solvents react with a strong acid, their unshared electrons are used to form sigma bond with the acid, which drives the reaction to completion (irreversibly).

Table 3 presents some of the important characteristics of the selected solvents. However, IPA is the preferred solvent in the LPP process. The preference of using IPA is attributed to its high precipitation ability with different basic salts, overall favorable properties, near complete reaction with strong acids, and relatively minimal environmental risks.

Improving the performance of LPP is always a target. One of the essential improvements is to minimize, if not eliminate, the use of the amine solvent. Inorganic additives can alternatively replace organic additives or can be used in addition to organic additives to induce precipitation of targeted species. The suitable inorganic additives for LPP are those that can form an insoluble inorganic-based mineral of targeted charged species in a saline stream. Such inorganic additives should preferably be recoverable and recyclable, useable as a useful by-product, or produced locally from reject or waste streams. Such inorganic additives should also not themselves constitute pollutants. Several inorganic additives were indentified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \tag{1}$$

where $\Delta G$ is the free energy of precipitates (provided by, for instance, mechanical agitation or other means), $\Delta H$ is the enthalpy that represents the binding energy of the dispersed phase precipitates in the saline stream, T is the temperature, and $\Delta S$ is the entropy of the dispersed phase precipitates (the state of precipitates disorder). The binding energy ($\Delta H$) can be expressed in terms of the surface tension (τ) and the increase in the surface area (ΔA) as follows:

$$\Delta G = \tau \Delta A - T \Delta S \quad (2)$$

When the introduced free energy into the saline stream exceeds the binding energy of precipitates, individual precipitates are broken down and redistributed. In addition, when a surface active agent is present in the saline stream as an effective dispersant, r is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy (ΔS) quantitatively defines precipitates dispersion.

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of a compressed amine solvent into an aqueous phase produces faster supersaturation of targeted ionic species, and their possible precipitation in the desired and sub-micron and micron sizes. Thus, the precipitate-size as well as the precipitate-size distribution, morphology, and crystal structure can be controlled. Achieving faster supersaturation would, in turn, minimize the use of the amine solvent, reduce the size of precipitation vessels, and allow the recovery of targeted ionic species in the desired precipitates shape and distribution.

Several factors could influence the performance of the precipitation process. Among such factors are: (1) the origin of the saline stream along with the identity and concentrations of its targeted ionic species; and (2) the way the additive (inorganic, organic, or both) is premixed or mixed with the saline stream to induce precipitation.

Treatment of Seawater and the Like of Saline Streams

De-Scaling Seawater and the Like of Saline Streams

Inspection of Table 1 indicates that calcium in seawater constitutes about 20% of the total divalent cations (calcium and magnesium). The averaged ratio (meq./L) of sulfate to the total divalent cations is about 40% whereas the averaged ratio of sulfate to magnesium is about 48%. Since the concentration of magnesium is almost double the concentration of sulfate, magnesium would be a sufficient and appropriate precipitation sink for sulfate to be precipitated as a useful layered double hydroxides based-mineral if it's supplemented with an appropriate trivalent cation along with a hydroxide source. The structure of such a mineral would then stem from the basic structure of brucite, which is the octahedral of magnesium (six-fold coordinated to hydroxyl groups) that share edges to form stacked layers held together by hydrogen bonding. When some of the magnesium ions are replaced by a trivalent cation having nearly an equivalent ionic radius (e.g., $Al^{+3}$ or $Fe^{+3}$), a net positive charge is permanently generated in the hydroxyl layers. This net positive charge is balanced by an interlayer of negatively charged anions (sulfate or sulfate-chloride in the case of seawater) that lies between the brucite-like layers. The free space of the interlayer is filled with water molecules. The structural features of such layered double hydroxides based-mineral are thus dictated by the: (1) nature of the brucite-like layer; (2) identity of the anion or anions in the interlayer; and (3) way the brucite-like layers are stacked.

Calcium, as a divalent cation, can be combined within the structure of the close packed configuration of the hydroxyl groups in the brucite-like layers. However, calcium has a larger ionic radius (0.98° A) than magnesium (0.65° A). Hence, calcium may not be homogenously fitted within the octahedral structure of brucite-like layers, if calcium concentration relative to magnesium concentration is high.

Seawater might preferably be depleted of calcium prior to the precipitation of the layered double hydroxides based-mineral. As such, seawater and the like of saline streams in this invention can be de-scaled in two selective precipitation stages. Calcium can be precipitated in the first stage from seawater upon intermixing or diffusing an appropriate amount of sodium carbonate, sodium phosphate, sodium alginate, or sulfated polysaccharide. However, effective precipitation of calcium phosphate upon the addition of sodium phosphate may require higher pH (8.5-9.5), and thus a hydroxide source may be needed. The hydroxide source can be an inorganic-based additive, an organic-based additive, or a combination of such additives. Once seawater is depleted of calcium, the second precipitation stage can be conducted in which sulfate is precipitated in the form of magnesium as layered double hydroxides upon the addition of an appropriate amount of either an aluminum or iron source along with, if needed, an excess amount of a hydroxide source. The use of aluminum hydroxide or iron hydroxide is preferred in this invention since each provides the needed trivalent cation and hydroxide.

The possible hydroxide source can be an inorganic-based additive such as aluminum hydroxide, iron hydroxide, magnesium hydroxide, and magnesium oxide; or an organic-based additive such as ammonia, methylamine, ethylamine, isopropylamine, propylamine, dimethylamine, diethylamine, diisopropylamine, and dipropylamine; or a combination of such inorganic-based and organic-based additives. The possible aluminum source includes aluminum hydroxide, aluminum chlorohydrate, sodium aluminate, aluminum acetate, aluminum chloride, and aluminum nitrate. The possible iron source includes iron hydroxide, sodium ferrate, iron chloride, and iron nitrate.

Alternatively, calcium can be co-precipitated with the layered double hydroxides based-mineral without distorting the desired structure of such a mineral since calcium concentration is relatively small in seawater compared to the concentration of magnesium. This was verified in one of my experiments. The de-scaling step can thus be conducted in one precipitation stage where sulfate is precipitated in the form of magnesium-calcium as layered double hydroxides upon the addition of an appropriate amount of either an aluminum or iron source along with, if needed, an excess amount of a hydroxide source. The precipitated layered double hydroxides based-mineral would thus contain divalent cations (magnesium-calcium), rather than a divalent cation (magnesium), and a trivalent cation (aluminum or iron) in the outside layers while their interlayer contains mainly sulfate and water molecules. Within the outside layers, a fraction of the brucite sheets are substituted with aluminum or iron, which provides permanent positive charge on the hydroxide layers. The positively charged hydroxide layers are counter-balanced by the negatively charged sulfate interlayer.

There are several industrial advantages for precipitating such layered double hydroxides based-minerals from seawater and the like of saline streams in this invention. First, their interlayers are highly exchangeable. Second, their exchanged interlayers can be re-activated or re-substituted for reuse. Third, they are valuable precipitating additives since each provides a source for divalent cations (magnesium or magnesium-calcium), trivalent cations (aluminum or iron), and hydroxides.

Integrating De-Scaling with De-Salting Seawater and the Like of Saline Streams

The de-scaling step is capable of depleting calcium to about 15 mg/L (or lower as in the case of using sodium phosphate as a calcium precipitating additive), magnesium to about 1 mg/L, and sulfate to about 40-50 mg/L from seawater. If the de-scaling step is integrated with seawater desalination plants, the remaining salts in seawater would be nearly in the form of sodium-potassium chloride (sylvinite). With such an integration, any thermal-driven distillation method can achieve a reject brine concentration ($C_B$) of 250,000 mg/L of TDS. Thermal-driven distillation methods include, for instance, MSF, Multi-Effect Distillation (MED), Thermal Vapor Compression (TVC), Mechanical Vapor Compression (MVC), Membrane Distillation (MD), or a combination of such methods. Pressure-driven (induced or osmotic) desalination methods such as Reverse Osmosis (RO), Forward Osmosis (FO), and Osmotic Membrane Distillation (OMD) can also be efficiently used with the de-scaling step to desalt seawater and the like of saline streams. However, RO must be operated at a much lower level of $C_B$ due to the osmotic pressure restriction. Design flow sheets that can be envisioned for conducting and optimizing each of such distillation methods or a combination of such methods to de-salt an effectively de-scaled seawater and the like of saline streams are almost limitless.

Figure 4:
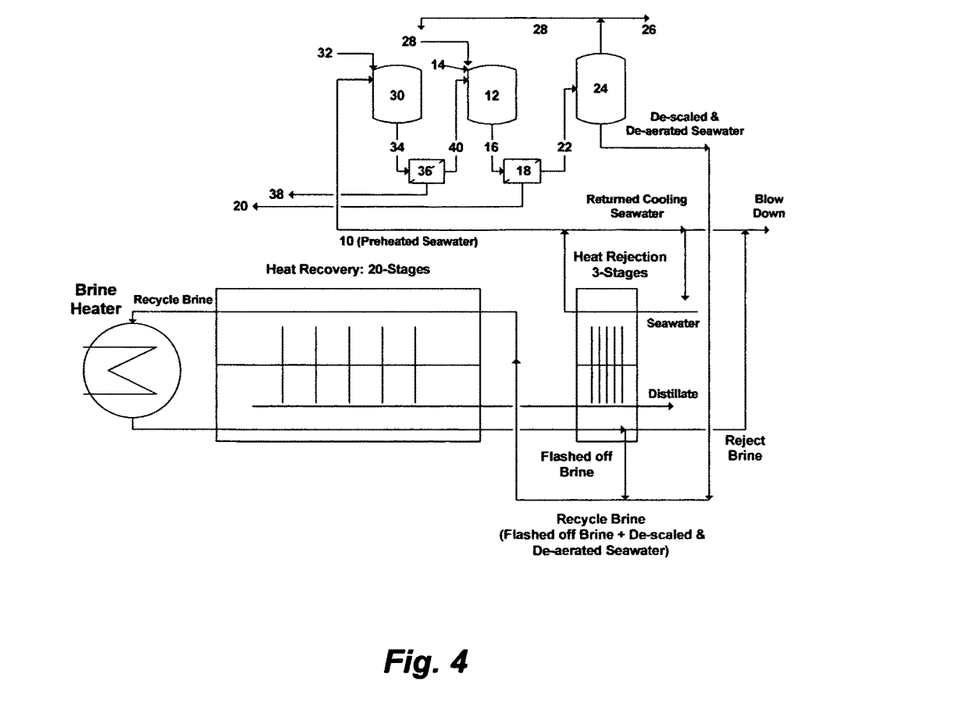
FIG. 4 illustrates a simplified flow diagram for integrating the de-scaling step with a RB-MSF train.

MSF is used as an example to demonstrate the benefits of the de-scaling step of this invention. A modified RB-MSF train with the de-scaling step is shown in FIG. 4. Pretreated (screening and chlorination) and preheated seawater by the heat rejection stage of the RB-MSF train [10] is fed to the first precipitation unit [30] where it is intermixed with a calcium precipitation additive [32] such as sodium carbonate, sodium phosphate, sodium alginate, or sulfated polysaccharide to form selective calcium precipitates. It should be pointed that a hydroxide source may be needed (not shown) when sodium phosphate is used as a calcium precipitating additive to aid in effectively precipitating calcium phosphate. The outlet stream [34] from the first precipitation unit [30] is directed to the first filtration unit [36] to separate the formed calcium precipitates (slurry) [38] from the calcium-depleted seawater [40]. The slurry [38] may be subjected to further dewatering and dehydration, or to regeneration and recycling as in the case of using sodium carbonate or sodium alginate (not shown).

The calcium-depleted seawater [40] is fed to the second precipitation unit [12] where it is intermixed with an aluminum source or an iron source [14] along with, if needed, an excess hydroxide source [28] to precipitate either magnesium sulfoaluminate (upon the addition of an aluminum source) or magnesium sulfoferrate (upon the addition of an iron source). The outlet stream [16] from the second precipitation unit [12] is then fed to the second filtration unit [18] to separate the formed precipitates (slurry) [20] from the de-scaled seawater [22]. The slurry of either magnesium sulfoaluminate or magnesium sulfoferrate [20] may be subjected to further proper dewatering and dehydration as well as calcination and activation (not shown).

Alternatively, seawater can be de-scaled in one precipitation stage. The processing steps [30-40] for the selective depletion of calcium from seawater as given in FIG. 4 would be eliminated. Thus, pretreated (screening and chlorination) and preheated seawater by the heat rejection stage of the RB-MSF train [10] is fed to the precipitation unit [12] where it is intermixed with an aluminum source or an iron source [14] along with, if needed, an excess hydroxide source [28] to precipitate either magnesium-calcium sulfoaluminate or magnesium-calcium sulfoferrate. The outlet stream [16] from the precipitation unit [12] is then fed to the filtration unit [18] to separate the formed precipitates (slurry) [20] from the de-scaled seawater [22]. The slurry of either magnesium-calcium sulfoaluminate or magnesium-calcium sulfoferrate [20] may be subjected to further dewatering, dehydration as well as possibly calcination and activation (not shown).

A plurality of precipitator units as well as intermixing and diffusing devices (e.g., static mixers, atomization nozzles, premixing nozzles, concentric nozzles, spray nozzles, twin-fluid nozzles, Y-shaped nozzles, cross-shaped nozzles, or a combination of such nozzles) can be used in each precipitation stage of de-scaling seawater and the like of saline streams.

The de-scaled seawater [22] is then de-aerated by a stripping unit [24]. The stripping unit can be a vacuum de-aerator or an indirect-contact heat exchanging stripper (a scrubber like unit). The indirect-contact heat exchanging stripper is of a particular interest since it not only facilitates efficient removal of dissolved gases (gases' aqueous solubilities generally decrease with increasing temperature) as well as efficient recovery the organic-based additive when used as a hydroxide source, but also adds heating energy to the de-scaled seawater. Waste heat is the preferred energy source that can be ideally paired with the indirect-contact heat exchanging stripper.

One of the sources of waste heat energy within power-seawater desalination co-generation plants is the returned condensates from brine heaters and low-pressure (LP) steam turbines. Cooling such pressurized condensates prior to their discharge into the atmospheric Condensates Recovery Tank (CRT) is essential to prevent condensates from flashing. If condensates are allowed to flash (without cooling), their sensible and latent heat energy will be lost in the CRT vent. Capturing the heat energy from condensates and transferring it to the de-scaled seawater via the indirect-contact heat exchanging stripper is ideal for heating further the de-scaled seawater and stripping off dissolved gases and organic-based additives (if used).

When the hydroxide source is an inorganic-based additive, the indirect-contact heat exchanging stripper [24] as shown in FIG. 4 is used to strip off dissolved gases [26]. On the other hand, when the hydroxide source is an organic-based additive, the indirect-contact heat exchanging stripper [24] is used to strip off both the organic-based additive and dissolved gases. The stripped off organic-based additive is then condensed (not shown) to segregate it [28] from the non-condensable gases [26] and recycled it to a storage tank (not shown) for reuse.

Seawater (pre-heated, de-scaled, de-aerated, and possibly further heated) is fed to the heat recovery section of the RB-MSF train. The de-scaling step reduces the TDS in seawater from 49,950 mg/L (Table 1, 2013 data) to about 40,000 mg/L. One of the possible ways to operate the RB-MSF plants are to fix $C_B$ at 250,000 mg/L at the same flashing range within the heat recovery section (70.1° C.) as each of the RB-MSF trains originally designed. $C_B$ at 250,000 mg/L and 40° C. from the last stage of the RB-MSF train is still well below the saturation limit of sodium chloride (about 365,000 mg/L). As such, the unsaturated but highly concentrated sodium chloride at 250,000 mg/L is unlikely to form precipitate films in the vicinity of heat transfer (condensers/pre-heaters) tubing. The pressure in the first flashing stage of the heat recovery section should be 768.8 mmHg (the boiling point of recycle brine is 106.93° C.) and decreases gradually to lower the boiling point of the flashed off brine in each consecutive stage until it reaches 42.8 mmHg in the last flashing stage of the heat rejection section ($C_B$: 250,000 mg/L; and $T_B$: 39.9° C.).

Table 4 presents the simulated performance of the de-scaled RB-MSF train when the $C_B$ and flashing range are fixed at, respectively, 250,000 mg/L and 70.1° C. to maintain the same production of distillate (593 kg/s or 15 MGD) as the original RB-MSF train. The recycle brine flow rate ($Q_r$) remains the same (5,398 kg/s or 136.6 MGD) as the original RB-MSF train without the de-scaling step. The cooling seawater flow rate ($Q_c$) is increased to 4,053 kg/s (102.6 MGD) in the de-scaled RB-MSF from 2,720 kg/s (68.8 MGD) in the original RB-MSF. However, seawater flow rate ($Q_F$) to be mixed with flashed off brine from the last stage of the heat rejection section to form recycle brine to feed the heat recovery section is substantially reduced from 2,829 kg/s (71.6 MGD) in the original RB-MSF train to 706 kg/s (17.9 MGD) in the de-scaled RB-MSF train. Reject brine flow rate ($Q_B$) is also substantially reduced from 2,236 kg/s (57.6 MGD) in the original RB-MSF train to 113 kg/s (2.9 MGD) in the de-scaled RB-MSF train. Thus, the total reduction in $Q_F$ for the de-scaled RB-MSF Plants I and II (8 trains per plant) would be 859 MGD whereas the total reduction in $Q_B$ from both plants would be 875 MGD. This represents tremendous savings in pumping power, de-scaling additives, down sizing de-aeration equipment.

It should be pointed out that the total required seawater ($Q_{Fc}$: retuned cooling seawater+seawater to be mixed with flashed off brine to form recycle brine) per train is reduced to 4,760 kg/s (120.5 MGD) in the de-scaled RB-MSF train from 5,549 kg/s (140.4 MGD) in the original RB-MSF train. The increase in returned cooling seawater in the de-scaled RB-MSF train is attributed to the reduction of seawater to be mixed with flashed off brine to form recycle brine. However, returned cooling seawater is not subjected to the de-scaling step and it is pre-treatment is only limited to screening and chlorination as well as a portion of it (about 20%) is recycled for bending with seawater before entering the heat rejection section.

The designed top brine temperature ($T_{TB}$) range of MSF plants is typically 120-150° C. For such a $T_{TB}$ range, steam to derive brine heaters of MSF trains can be extracted from the steam turbines stage (the heat recovery circuits of the coupled power plants) between the high-pressure (HP) and intermediate-pressure (LP) steam turbines or from the HP steam turbine. It provides higher temperature flashing ranges and allows expanding the heat recovery section of the MSF train from 20 to 40 stages. This, in turn, allows better performance ratio (e.g., 20), which reduces the steam load and/or increases distillate production as well as allows steady operation (due to better performance of heat transfer coefficients). Such a higher $T_{TB}$ range is mainly avoided because of the calcium sulfate scale envelop and the temperature tolerance limit (110° C.) of scale inhibitors. The de-scaling step would thus lift such imposed restrictions on $T_{TB}$.

Table 4 also shows the simulated performance of the de-scaled RB-MSF train when $C_B$ and flashing range are fixed at, respectively, 250,000 mg/L and 110.1° C. ($T_{TB}$: 150° C.) to maintain the same production of distillate (593 kg/s or 15 MGD). $Q_F$ and $Q_B$ also remain the same as in the lower flashing range. However, the higher flashing range (110.1° C.) substantially reduces $Q_r$, $Q_c$, $Q_{FC}$ and $Q_S$ compared to the lower flashing range (70.1° C.) in each train as follows: (1) $Q_r$ is reduced to 2,886 kg/s (73.0 MGD) from 5,398 kg/s (136.6 MGD); (2) $Q_c$ is reduced to 3,384 kg/s (85.6 MGD) from 4,053 kg/s (102.6 MGD); (3) $Q_{Fc}$ is reduced to 4,090 kg/s (103.5 MGD) from 4,760 kg/s (120.5 MGD); and (4) $Q_S$ is reduced to 59.6 kg/s from 83.3 kg/s. The reduction in Q also reduces the recycle brine concentration ($C_r$) to 198,622 mg/L from 222,513 mg/L whereas the reduction in $Q_S$ increases the performance ratio from 7.1 to 10. For the de-scaled RB-MSF Plants I and II (8 trains per plant) at the higher flashing range compared to the lower flashing range, the total reduction in: (1) $Q_r$ is 40,192 kg/s (1,017.1 MGD); (2) $Q_c$ is 10,700 kg/s (270.8 MGD); (3) $Q_{Fc}$ is 10,720 kg/s (271.3 MGD); and (4) $Q_S$ is 379.2 kg/s. Hence, the de-scaling step allows RB-MSF plants to reach their designed $T_{TB}$ (150° C.) and substantially reduces $Q_r$, $Q_c$, $Q_{FC}$ and $Q_S$, which tremendously reduces pumping power and increases the performance ratio. As such, two RB-MSF trains with one heat rejection section can be coupled with one brine heater or PR can be doubled by using a train of 43-stages rather than 23-stages.

The de-scaling step clearly aids RB-MSF plants in resolving calcium sulfate scale, increasing PR, and substantially reducing $Q_F$, $Q_r$, $Q_c$, $Q_{Fc}$ and $Q_B$. However, the required pumping power for returned cooling seawater and recycle brine still remains significant, which is the inherited disadvantage of the RB-MSF concept. Another striking disadvantage of the RB-MSF concept, which stems from need for cooling seawater in the heat rejection section of each train, is that the de-scaling step must be added to each train of the RB-MSF plant. To resolve this issue, separate cooling seawater can be used for the heat rejection section of each train, while seawater to be mixed with recycle brine can be processed independently using one de-scaling step coupled with one indirect-contact heat exchanging stripper to de-scale, preheat and de-aerate seawater before feeding the whole RB-MSF plant.

Figure 5:
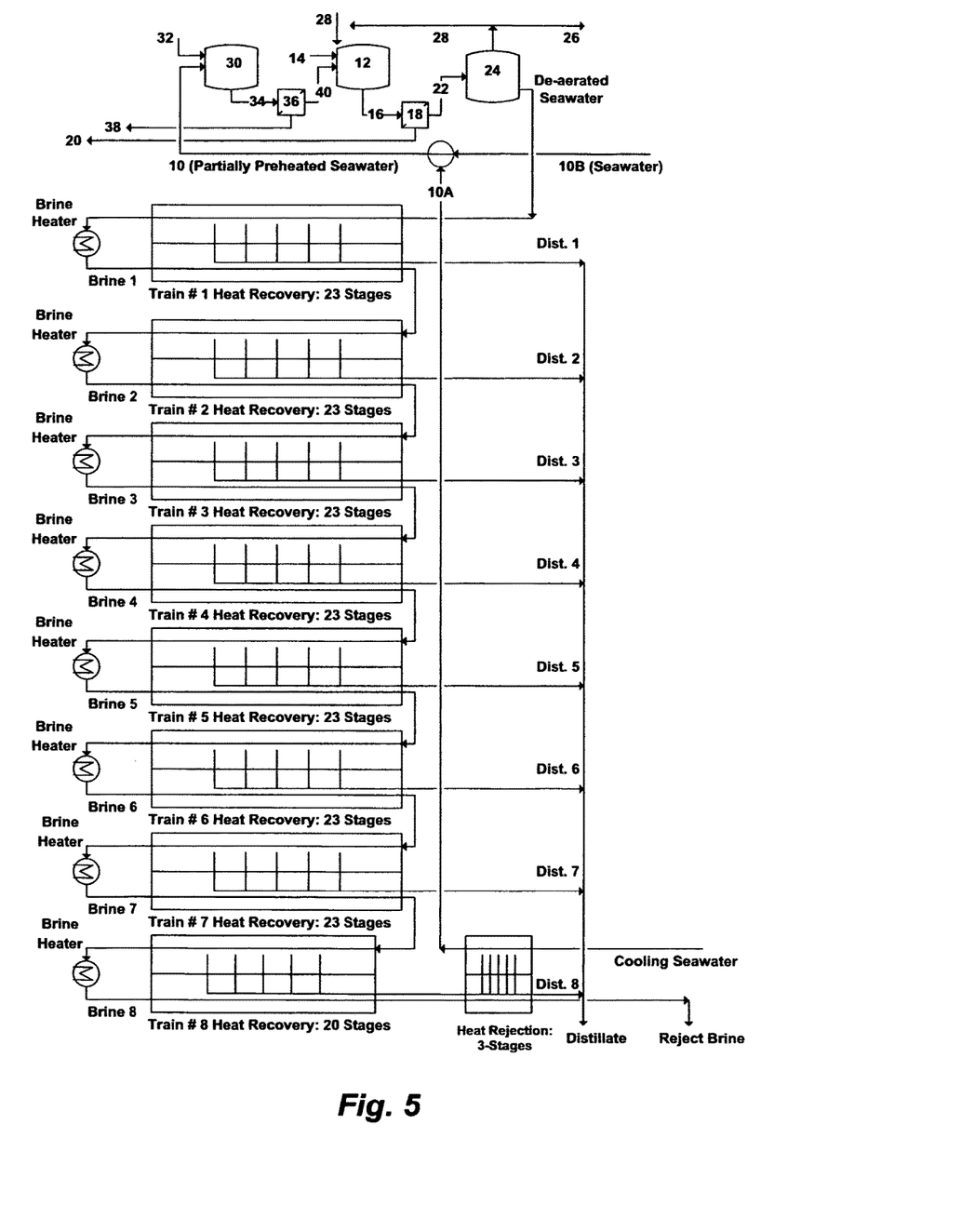
FIG. 5 illustrates a simplified flow diagram for integrating the de-scaling step with the new concept of a Brine-Forward Multi-Stage Flash (BF-MSF) desalination plant.

Alternatively, what I coined Brine-Forward MSF (BF-MSF) desalination plant in conjunction with the de-scaling step as depicted in FIG. 5, would entirely eliminate recycle brine and require only one de-scaling step for the whole plant. For a comparison purpose, the BF-MSF plant consists of eight trains and each train consists of total 23 stages (similar to the recently installed RB-MSF plants in terms of number of trains and total number of stages per train). Each train of the BF-MSF plant consists of 23 stages of heat recovery except the last train, which is divided into a heat recovery section (20 stages) and a heat rejection section (3 stages) to recover more distillate from the last train at low temperatures (40-33° C.) before rejecting brine. Cooling seawater is only used for the heat rejection section of the last train. Cooling seawater ($Q_c$) that gains heat as it exists the heat rejection section of the last train [10A] is completely used (no rejected $Q_c$) by mixing with pretreated seawater ($Q_F$) [10B] to partially preheat and compose the total required seawater ($Q_{FC}$) $Q_{Fc}$ in the BF-MSF plant is thus the sum of $Q_c$ and $Q_F$, which is totally utilized to feed the trains.

This is unlike the RB-MSF plant where $Q_{Fc}$ is the sum of the utilized $Q_c$ in feeding the trains (referred to as $Q_F$) and the returned (rejected) $Q_c$.

The partially preheated total required seawater in the BF-MSF plant as shown in FIG. 5 is subjected to de-scaling and de-aeration (similar to the above described processing steps [10-40] of FIG. 4 for the dual precipitation stages or similar to the processing steps [10-28] of FIG. 4 for the single precipitation stage) before entering the first train. The brine forward feeding concept is then applied, in which the brine from each train passes through to feed the next train of the BF-MSF plant, and each train possesses a higher concentration factor ($C_B/C_F$: 1.26) of brine than the previous train. This allows consecutive increase in the concentration factor of brine as it gets more concentrated in going down the trains. TDS in reject brine ($C_B$) exiting the last train can be set at 250,000 mg/L.

The BF-MSF concept is thus multi-boiling without supplying additional heat after the brine heater of each train, and multi-concentration without supplying additional seawater after the first train of the plant. The concept is aimed at entirely eliminating recycle brine, substantially reducing as well as completely utilizing cooling seawater, and using one de-scaling step, rather than multiple de-scaling steps, to serve the whole plant.

Table 5 presents the simulated performance of the de-scaled BF-MSF plant (FIG. 5) at 250,000 mg/L of $C_B$ with a lower flashing range (70.1° C.) and a higher flashing range (110.1° C.). At the lower flashing range, the de-scaled BF-MSF plant provides higher PR (8.23) but lower $Q_D$ (3,742 kg/s or 94.7 MGD) and higher $Q_B$ (1,906 kg/s or 48.2 MGD) than the de-scaled RB-MSF plant (PR: 7.12; $Q_D$: 4,744 kg/s or 120 MGD; and $Q_B$: 904 kg/s or 22.9 MGD) at the same flow rate of seawater that actually feeds the trains ($Q_{Fc}$ in the case of BF-MSF and $Q_F$ in the case of RB-MSF). However, the distinct advantages of the de-scaled BF-MSF plant compared to the de-scaled BR-MSF plant (Table 4) are: (1) the total elimination of $Q_r$; and (2) the substantial reduction of $Q_c$ (364 kg/s or 9.2 MGD) as well as its complete utilization (returned $Q_c$ from the BR-MSF plant is 32,422 kg/s or 820.5 MGD).

At the higher flashing range, the de-scaled BF-MSF plant provides equivalent performance to the de-scaled RB-MSF plant in terms of $Q_D$, $Q_B$, $Q_S$ and PR. Furthermore, the de-scaled BF-MSF plant eliminates $Q_r$, significantly reduces $Q_c$ to 473 kg/s (12.0 MGD), and completely utilizes $Q_c$ compared to the de-scaled BR-MSF plant (returned $Q_c$ from the BR-MSF plant is 27,072 kg/s or 685.1 MGD). The main objective of the de-scaling step is therefore achieved by allowing a higher flashing range and a better MSF design (BF concept) that does not require pumping enormous volumes of recycle brine and cooling seawater.

Sufficient seawater preheating is essential, but is not a must, since only the rear-end stages of the first train of the BF-MSF plant may be affected by it. If the striping unit is not based on indirect-contact heat exchanging or returned condensates from brine heaters and/or LP steam turbines are not available to further heat the de-scaled seawater, then one of the possible ways to sufficiently preheat seawater is to utilize blow down streams from brine heaters and/or from the LP steam turbines. Blow down is necessary to control dissolved solids and scale-prone species in brine heaters and steam turbines, yet blow down streams from brine heaters and steam turbines account for 3% loss of their energy input. Significant amounts of heat input to the brine heaters and steam turbines are lost as both sensible and latent heat energy contained in the existing blow down streams at 110-120° C. (at the lower MSF flashing range). Heat recovery from such blow down streams by a condensing heat exchanger can offset much, if not all, of the required thermal energy to sufficiently preheat seawater. A direct-contact heat exchanger is ideal for removing heat from such blow down streams to preheat seawater.

Figure 6:
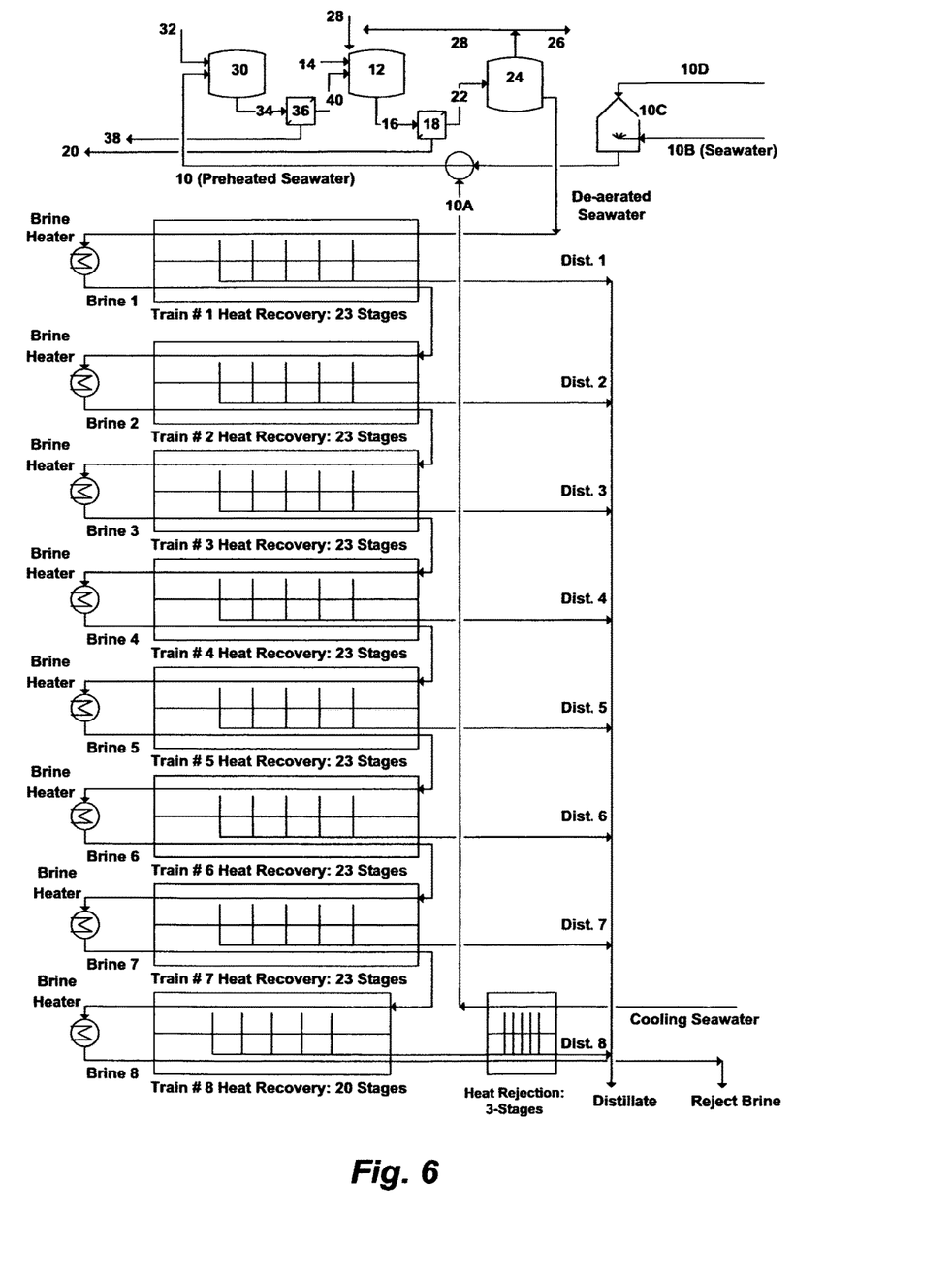
FIG. 6 illustrates a simplified flow diagram for integrating the de-scaling step with the new concept of a BF-MSF desalination plant with direct-contact heat exchanging.

FIG. 6 shows the integrated de-scaling step with the BF-MSF plant using direct-contact heat exchanging to preheat seawater. Cooling seawater that gains heat as it exists the heat rejection section of the last train [10A] is mixed with pretreated and preheated seawater [10B] to compose the preheated total required seawater [10]. The preheating of seawater [10B] is accomplished by a direct-contact heat exchanger [10C] using blow down streams [10D] from brine heaters and/or LP steam turbines. The de-scaling step facilitates the efficient use of the direct-contact heat exchanger since it's located after preheating takes place and it targets the precipitation of scale-prone species from the preheated total required seawater, which is a mixture of seawater, blow down streams and cooling seawater. The de-scaling and de-aeration of the preheated total required seawater as shown in FIG. 6 are similar to the above described processing steps [10-40] of FIG. 4 for the dual precipitation stages or the processing steps [10-28] of FIG. 4 for the single precipitation stage. The preheated, de-scaled and de-aerated seawater is then fed to the first train of the BF-MSF plant where the brine forward feeding concept is applied to subsequent trains.

The de-scaling step also facilitates the pairing of two BF-MSF heat recovery trains with one brine heater or expanding the stages of each heat recovery train to 40 stages at the higher flashing range (100.1° C.).

The integrated RB-MSF or BF-MSF plant with the de-scaling step can reject brine at lower $C_B$ levels. As given in one my newly filed patent applications, the preference of rejecting brine at 250,000 mg/L is that rather than blowing it back to the sea, it can be utilized to effectively precipitate and produce sodium carbonate in profitable amounts at such $C_B$ in conjunction with recovering $CO_2$ and waste heat energy from flue gas of the coupled power plants. The recovered waste heat energy from flue gas can offset the steam required at high flashing ranges. This offset will reduce fuel consumption while maintaining a fixed net steam output from the coupled "combined cycle" power plant, or when required, it will increase the net steam output by maintaining the same fixed fuel consumption.

Reject brine from RB-MSF or BR-MSF plants can also be used for oil-fields Improved Oil Recovery (IOR) as an ideal fluid since its readily depleted of sulfate, other scale-prone species, and oxygen.

TABLE 1

Changes in Seawater before and after Operating BR-MSF Plants.

| Ions (mg/L) | 2006 Before Operating Plant I | 2009 After Operating Plant I | 2013 After Operating Plants I & II |
|---|---|---|---|
| $Na^+$ | 12,173 | 13,630 | 14,530 |
| $K^+$ | 423 | 524 | 611 |
| $Mg^{+2}$ | 1,529 | 1,886 | 2,145 |
| $Ca^{+2}$ | 530 | 667 | 699 |
| $Sr^{+2}$ | 5 | 7 | 8 |
| $Cl^-$ | 22,000 | 25,550 | 27,710 |
| $HCO_3^-$ | 140 | 146 | 147 |
| $SO_4^{-2}$ | 2,700 | 3,770 | 4,100 |
| TDS | 39,500 | 46,200 | 49,950 |

TABLE 2

BR-MSF vs. OT-MSF Performance Based on Seawater Variations.

| Parameters | Start-up RB-MSF (2006) | Fixed C.F. RB-MSF (2013) | Fixed $C_B$ RB-MSF (2013) | Fixed $C_B$ OT-MSF (2013) |
|---|---|---|---|---|
| MSF Train: | | | | |
| $C_F$: TDS, mg/L | 39,500 | 49,950 | 49,950 | 49,950 |
| CF: $SO_4^{-2}$, mg/L | 2,700 | 4,100 | 4,100 | 4,100 |
| $T_F$, °C. | 33 | 33 | 33 | 33 |
| $T_B$, °C. | 39.9 | 39.9 | 39.9 | 39.9 |
| $T_{TB}$, °C. | 110 | 110 | 110 | 110 |
| #S | 23 | 23 | 23 | 23 |
| $Q_F$, kg/s | 1,617 | 1,617 | 2,829 | 2,829 |
| $Q_c$, kg/s | 3,932 | 3,932 | 2,720 | 0 |
| $Q_{Fc}$, kg/s | 5,549 | 5,549 | 5,549 | 2,829 |
| $Q_r$, kg/s | 5,398 | 5,398 | 5,398 | 0 |
| $C_r$: TDS, mg/L | 56,101 | 70,943 | 56,255 | 0 |
| $C_r$: $SO_4^{-2}$, mg/L | 3,835 | 5,823 | 4,618 | 0 |
| $C_r/C_F$ | 1.42 | 1.42 | 1.13 | 0 |
| $Q_B$, kg/s | 1,011 | 1,011 | 2,236 | 2,236 |
| $C_B$: TDS, mg/L | 63,200 | 79,920 | 63,200 | 63,200 |
| $C_B$: $SO_4^{-2}$, mg/L | 4,320 | 6,560 | 5,188 | 5,188 |
| $C_B/C_F$ | 1.6 | 1.6 | 1.27 | 1.27 |
| $Q_D$, kg/s | 593 | 593 | 593 | 593 |
| $Q_S$, kg/s | 62.9 | 62.9 | 62.9 | 33 |
| PR | 9.4 | 9.4 | 9.4 | 13.6 |
| MSF Plant (8 Trains): | | | | |
| $\Sigma Q_F$, kg/s (MGD) | 12,936 (327.4) | 12,936 (327.4) | 22,632 (572.8) | 22,632 (572.8) |
| $\Sigma Q_c$, kg/s (MGD) | 31,456 (769.1) | 31,456 (769.1) | 21,760 (550.7) | 0 |
| $\Sigma Q_{Fc}$, kg/s (MGD) | 44,392 (1,123.4) | 44,392 (1,123.4) | 44,392 (1,123.4) | 22,632 (572.8) |
| $\Sigma Q_r$, kg/s (MGD) | 43,184 (1,092.9) | 43,184 (1,092.9) | 43,184 (1,092.9) | 0 |
| $\Sigma Q_B$, kg/s (MGD) | 8,088 (204.7) | 8,088 (204.7) | 17,888 (452.7) | 17,888 (452.7) |
| $\Sigma Q_D$, kg/s (MGD) | 4,744 (120) | 4,744 (120) | 4,744 (120) | 4,744 (120) |
| $\Sigma Q_S$, kg/s (MGD) | 503.2 | 503.2 | 503.2 | 264.0 |

C.F.: Concentration Factor; $Q_F$: Seawater Feed Mass Flow to be mixed with flashed off brine; $Q_c$: Cooling Seawater Mass Flow; $Q_{Fc}$: Total Required Seawater Mass Flow ($Q_F + Q_c$); $C_F$: Seawater Concentration; $T_F$: Seawater Temperature; $T_B$: Reject Brine Temperature; $T_{TB}$: Top Brine Temperature; #S: Number of Stages; $Q_r$: Recycle Brine Mass Flow; $C_r$: Recycle Brine Concentration; $Q_B$: Reject Brine Mass Flow; $C_B$: Reject Brine Concentration; $Q_D$: Distillate Mass Flow; $Q_S$: Steam Mass Flow; $P_R$: Performance Ratio; and MGD: million US gallons per day.

TABLE 3

Properties of Selected Pure Solvents.

| Fluid | Solubility in Water | $T_b$ °C. | $C_P$ kJ/kg °C. | $H_v$ kJ/kg | $\Delta H_f^0$ kJ/kg |
|---|---|---|---|---|---|
| $NH_3$ | Highly Soluble | −33.45 | 2.19 | 1,370.8 | −2,695 |
| MA ($CH_5N$) | Extremely Soluble | −6.35 | 3.28 | 790.8 | −1,517 |
| DMA ($C_2H_2N$) | Extremely Soluble | 6.85 | 3.03 | 587.4 | −974 |
| EA ($C_2H_7N$) | Miscible | 16.55 | 2.85 | 621.8 | −1,644 |
| DEA ($C_4H_{15}N$) | Miscible | 55.45 | 2.44 | 380.4 | −1,418 |
| IPA ($C_3H_9N$) | Miscible | 32.45 | 2.77 | 460.1 | −1,900 |
| DIPA ($C_6H_9N$) | Highly Soluble | 83.95 | 2.64 | 341.9 | −1,765 |
| PA ($C_3H_9N$) | Miscible | 48.65 | 2.75 | 502.6 | −1,717 |
| DPA ($C_6H_{15}N$) | Soluble | 109.35 | | 368.6 | −1,543 |

$T_b$: Normal Boiling Point; $C_P$: Specific Heat Capacity; $H_v$: Heat of Vaporization at Normal Boiling Point; and $\Delta H_f^0$: Standard Enthalpy of Formation.

TABLE 4

Integrating the De-Scaling Step with the BR-MSF Plant.

| Parameters | Lower Flashing Range as designed | Higher Flashing Range |
|---|---|---|
| RB-MSF Train: | | |
| $C_F$: TDS, mg/L | 40,000 | 40,000 |
| $C_F$: $SO_4^{-2}$, mg/L | 40 | 40 |
| $T_F$, °C. | 33 | 33 |
| $T_B$, °C. | 39.9 | 39.9 |
| $T_{TB}$, °C. | 110 | 150 |
| #S | 23 | 23 |
| $Q_F$, kg/s | 706 | 706 |
| $Q_c$, kg/s | 4,053 | 3,384 |
| $Q_{Fc}$, kg/s | 4,760 | 4,090 |
| $Q_r$, kg/s | 5,398 | 2,886 |
| $C_r$: TDS, mg/L | 222,513 | 198,622 |
| $C_r$: $SO_4^{-2}$, mg/L | 222.5 | 198.6 |
| $C_r/C_F$ | 5.56 | 4.97 |
| $Q_B$ (kg/s) | 113 | 113 |
| $C_B$: TDS, mg/L | 250,000 | 250,000 |
| $C_B$: $SO_4^{-2}$, mg/L | 250 | 250 |
| $C_B/C_F$ | 6.25 | 6.25 |
| $Q_D$, kg/s | 593 | 593 |
| $Q_S$, kg/s | 83.3 | 59.6 |
| PR | 7.12 | 9.95 |
| RB-MSF Plant (8 Trains): | | |
| $\Sigma Q_F$, kg/s (MGD) | 5,648 (142.9) | 5,648 (142.9) |
| $\Sigma Q_c$, kg/s (MGD) | 32,422 (820.5) | 27,072 (685.1) |
| $\Sigma Q_{Fc}$, kg/s (MGD) | 38,080 (963.7) | 32,720 (828.1) |
| $\Sigma Q_r$, kg/s (MGD) | 43,184 (1,092.9) | 23,088 (584.3) |
| $\Sigma Q_B$, kg/s (MGD) | 904 (22.9) | 904 (22.9) |
| $\Sigma Q_D$ kg/s (MGD) | 4,744 (120) | 4,744 (120) |
| $EQ_S$, kg/s (MGD) | 666.4 | 476.8 |
| PR | 7.12 | 9.95 |

TABLE 5

Integrating the De-Scaling Step with the Design BF-MSF Plant.

| Parameters | Lower Flashing Range | Higher Flashing Range |
|---|---|---|
| $C_F$: TDS, mg/L | 40,000 | 40,000 |
| CF: $SO_4^{-2}$, mg/L | 40 | 40 |
| $T_F$, °C. | 33 | 33 |
| $T_B$, °C. | 39.9 | 39.9 |
| $T_{TB}$, °C. | 110 | 150 |
| #S | 23 | 23 |
| BF-MSF Train # 1: | | |
| $Q_F$, kg/s | 5648 | 5648 |
| $Q_{D1}$, kg/s | 717.2 | 1159.4 |
| $Q_{S1}$, kg/s | 87.2 | 116.6 |
| $Q_{B1}$, kg/s | 4,931 | 4,488.2 |
| $C_{B1}/C_F$ | 1.26 | 1.26 |
| BF-MSF Train # 2: | | |
| $Q_{D2}$, kg/s | 626.1 | 921.4 |
| $Q_{S2}$, kg/s | 76.1 | 92.7 |
| $Q_{B2}$, kg/s | 4,305 | 3566.8 |
| $C_{B2}/C_{B1}$ | 1.26 | 1.26 |
| BF-MSF Train # 3: | | |
| $Q_{D3}$, kg/s | 546.6 | 732.3 |
| $Q_{S3}$, kg/s | 66.4 | 73.6 |
| $Q_{B3}$, kg/s | 3,758 | 2,834.5 |
| $C_{B3}/C_{B2}$ | 1.26 | 1.26 |
| BF-MSF Train #4: | | |
| $Q_{D4}$, kg/s | 477.2 | 591.9 |
| $Q_{S4}$, kg/s | 58.0 | 58.5 |
| $Q_{B4}$, kg/s | 3,281 | 2,252.6 |
| $C_{B4}/C_{B3}$ | 1.26 | 1.26 |
| BF-MSF Train # 5: | | |
| $Q_{D5}$, kg/s | 416.6 | 462.5 |
| $Q_{S5}$, kg/s | 50.6 | 46.5 |
| $Q_{B5}$, kg/s | 2,864 | 1,790.1 |
| $C_{B5}/C_{B4}$ | 1.26 | 1.26 |
| BF-MSF Train # 6: | | |
| $Q_{D6}$, kg/s | 363.7 | 367.5 |
| $Q_{S6}$, kg/s | 44.2 | 37.0 |
| $Q_{B6}$, kg/s | 2,501 | 1,422.6 |
| $C_{B6}/C_{B5}$ | 1.26 | 1.26 |
| BF-MSF Train # 7: | | |
| $Q_{D7}$, kg/s | 317.5 | 292.1 |
| $Q_{S7}$, kg/s | 38.6 | 29.4 |
| $Q_{B7}$, kg/s | 2,183 | 1,130.5 |
| $C_{B7}/C_{B6}$ | 1.26 | 1.26 |
| BF-MSF Train # 8: | | |
| $Q_{D8}$, kg/s | 277.2 | 232.1 |
| $Q_{S8}$, kg/s | 33.7 | 23.3 |
| $Q_{B8}$, kg/s | 1,906 | 898.5 |
| $Q_{c8}$, kg/s | 364 | 472 |
| $C_{B8}/C_{B7}$ | 1.24 | 1.24 |
| BF-MSF Plant (8 Trains): | | |
| $Q_F$, kg/s (MGD) | 5,284 (133.7) | 5,175 (130.9) |
| $Q_c$, kg/s (MGD) | 364 (9.2) | 473 (12.0) |
| $Q_{FC}$, kg/s (MGD) | 5,648 (142.9) | 5,648 (142.9) |
| $\Sigma_{QD}$, kg/s (MGD) | 3,742 (94.7) | 4,750 (120.2) |
| $\Sigma_{QS}$, kg/s (MGD) | 454.7 | 477.6 |
| PR | 8.23 | 9.95 |
| $Q_B$, kg/s (MGD) | 1,906(48.2) | 898(22.7) |
| $C_B$: TDS, mg/L | 250,078 | 250,078 |
| $C_B$: $SO_4^{-2}$, mg/L | 250 | 250 |
| $C_B/C_F$ | 6.25 | 6.25 |

What is claimed is:

1. A method for desalinating a de-scaled and de-aerated saline stream, said method comprising producing distillate and de-scaled brine in a desalination system, said desalination system comprises a Brine-Forward Multi-Stage Flash (BF-MSF) desalination system, said BF-MSF desalination system comprises a plurality of trains arranges in series, in which each train comprises a brine heater and a heat recovery section except a last train, said last train comprises a brine heater, a heat recovery section and a heat rejection section, said de-scaled and de-aerated saline stream is fed to a first train of said BF-MSF desalination system, wherein said each train is operated at a preselected concentration factor, said each train produces said distillate and said de-scaled brine, said de-scaled brine from said each train except said last train passes through to feed the next succeeding train thereby said each train progressively possesses a higher level of total dissolved solids (TDS) than a preceding train, and said de-scaled brine from said last train is rejected at a concentration not exceeding 250,000 mg/L of said TDS, whereby said BF-MSF desalination system is a multi-boiling system wherein no additional heat is required after said brine heater of each train, and provides a multi-concentration system wherein no additional supply of de-scaled and de-aerated saline stream after said first train.

2. The method of claim 1 wherein said de-scaled and de-aerated saline stream includes the steps of separating calcium and sulfate from a saline feed stream by:
 (a) mixing said saline feed stream with a calcium-precipitating additive to form a first precipitate comprising said calcium in a first precipitator unit and filtering said first precipitate by a first filter to produce a de-calcium saline stream;
 (b) separating said sulfate from said de-calcium saline stream by mixing said de-calcium saline stream with a trivalent cation source and a hydroxide source to form a second precipitate comprising magnesium sulfoaluminate or magnesium sulfoferrate in a second precipitator unit and filtering said second precipitate by a second filter to produce a de-scaled saline stream; and
 (c) de-aerating said de-scaled saline stream in a stripping unit to produce said de-scaled and de-aerated saline stream.

3. The method of claim 2, wherein said saline feed stream is selected from the group consisting of seawater, brine from seawater desalination plants, natural brine, brackish water, produced water, flue gas desulphurization spent water, agricultural drainage water, acid mine drainage water, mineral slurry transport water, paper mills spent water, aluminum anodizing spent water, spent water from fertilizer production, lime slaking, spent water from textile production, and combinations thereof.

4. The method of claim 2, wherein said calcium-precipitating additive is selected from the group consisting of sodium carbonate, sodium phosphate, sodium alginate, sulfated polysaccharide, and combinations thereof.

5. The method of claim 2, wherein said hydroxide source is selected from the group consisting of aluminum hydroxide, iron hydroxide, magnesium hydroxide, magnesium oxide, ammonia, methylamine, ethylamine, isopropylamine, propylamine, dimethylamine, diethylamine, diisopropylamine, dipropylamine, and combinations thereof.

6. The method of claim 2, wherein said trivalent cation source comprises either an aluminum-based additive or an iron-based additive.

7. The method of claim 6, wherein said aluminum-based additive is selected from the group consisting of aluminum hydroxide, aluminum chlorohydrate, sodium aluminate, aluminum acetate, aluminum chloride, aluminum nitrate, and combinations thereof.

8. The method of claim 6, wherein said iron-based additive is selected from the group consisting of iron hydroxide, sodium ferrate, iron chloride, iron nitrate, and combinations thereof.

9. The method of claim 2, in step (a) further comprising mixing a hydroxide source with said saline feed stream and said calcium-precipitating additive source.

10. The method of claim 9, wherein said stripping unit further comprises an indirect contact heat exchanger to heat said de-scaled saline stream by a heat source.

11. The method of claim 10, wherein said heat source is selected from the group consisting of a return condensate from a brine heater, a return condensate from a turbine, and combinations thereof.

12. The method of claim 1 wherein said de-scaled and de-aerated saline stream includes the steps of separating calcium and sulfate from a saline feed stream by:
(a) separating said calcium and said sulfate from said saline feed stream by: (i) mixing said saline feed stream with said trivalent cation source and said hydroxide source to form a precipitate comprising magnesium-calcium sulfoaluminate or magnesium-calcium sulfoferrate in a precipitator unit; (ii) filtering said precipitate by a filter to produce said de-scaled saline stream; and
(b) de-aerating said de-scaled saline stream by said stripping unit to produce said de-scaled and de-aerated saline stream.

13. The method of claim 2 or 12 wherein said saline feed stream is pre-heated prior to producing said de-scaled and de-aerated saline stream.

14. The method of claim 13 wherein said preheating further comprises passing at least a portion of said saline feed stream through heat transfer tubings of a heat rejection section within the desalination train to exchange heat with flashing brine in said heat rejection section of said desalination system to produce a preheated portion of saline feed stream.

15. The method of claim 14, wherein said preheated portion of saline feed stream comprises blending with at least another portion of said saline feed stream within the desalination system to produce at least a preheated saline feed stream.

16. The method of claim 15, wherein said portion of saline feed stream is heat exchanged by passing at least a portion of saline feed stream in a heat exchanger to exchange heat with another heat source within said desalination system.

17. The method of claim 16, wherein the heat source is selected from the group consisting of a blowdown-stream from a brine heater, a blowdown stream from a turbine and combination thereof.

18. The method of claim 16, wherein the heat exchanger is a direct contact heat exchanger.

19. The method of claim 1, wherein said BF-MSF desalination system further comprises
a plurality of trains arranges in series, in which each train comprises a brine heater and a heat recovery section, said de-scaled and de-aerated saline stream is fed to a first train of said BF-MSF desalination system, said each train is operated at a preselected concentration factor, said each train produces said distillate and said de-scaled brine, said de-scaled brine from said each train except a last train passes through to feed the next succeeding train thereby said each train progressively possesses a higher level of total dissolved solids (TDS) than a preceding train, and said de-scaled brine from said last train is rejected at a level not exceeding 250,000 mg/L of said TDS, thereby said BF-MSF desalination system is a multi-boiling system without supplying additional heat after said brine heater of said each train, and a multi-concentration system without supplying additional said de-scaled and de-aerated saline stream after said first train.

20. The method of claim 1, wherein said desalination system is further selected from the group consisting of a recycle-brine multi-stage flash desalination train, a once-through multi-stage flash desalination train, multi-effect distillation, thermal vapor compression, mechanical vapor compression, vacuum membrane distillation, direct-contact membrane distillation, osmotic membrane distillation, reverse osmosis, forward osmosis, and combinations thereof.

* * * * *